United States Patent
Flanders

(10) Patent No.: US 8,725,434 B2
(45) Date of Patent: May 13, 2014

(54) WELLHEAD HIPS WITH AUTOMATIC TESTING AND SELF-DIAGNOSTICS

(75) Inventor: Patrick S. Flanders, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 634 days.

(21) Appl. No.: 13/008,989

(22) Filed: Jan. 19, 2011

(65) Prior Publication Data

US 2011/0144946 A1 Jun. 16, 2011
US 2012/0221295 A2 Aug. 30, 2012

Related U.S. Application Data

(63) Continuation-in-part of application No. 11/648,312, filed on Dec. 29, 2006, now Pat. No. 7,905,251.

(51) Int. Cl.
G01L 7/00 (2006.01)

(52) U.S. Cl.
USPC ............... 702/50; 340/514; 137/487.5

(58) Field of Classification Search
USPC ............... 702/50; 340/514; 137/487.5
See application file for complete search history.

(56) References Cited

U.S. PATENT DOCUMENTS

| | | | |
|---|---|---|---|
| 1,246,803 A | 11/1917 | Doti | |
| 4,174,729 A | 11/1979 | Roark | |
| 4,215,746 A | 8/1980 | Hallden | |
| 4,521,221 A | 6/1985 | Richter | |
| 4,848,393 A * | 7/1989 | West | 137/312 |
| 4,903,529 A | 2/1990 | Hodge | |
| 5,524,484 A | 6/1996 | Sullivan | |
| 5,730,166 A | 3/1998 | Ackerley | |
| 6,090,294 A | 7/2000 | Teran | |
| 6,591,201 B1 | 7/2003 | Hyde | |
| 6,739,804 B1 | 5/2004 | Haun | |
| 6,880,567 B2 * | 4/2005 | Klaver et al. | 137/487.5 |
| 7,044,156 B2 * | 5/2006 | Webster | 137/488 |
| 7,478,012 B2 | 1/2009 | Tewes | |
| 2002/0145515 A1 * | 10/2002 | Snowbarger et al. | 340/514 |
| 2004/0093173 A1 | 5/2004 | Essam | |
| 2005/0199286 A1 * | 9/2005 | Appleford et al. | 137/487.5 |
| 2005/0279408 A1 * | 12/2005 | Henderson et al. | 137/487.5 |
| 2006/0150640 A1 | 7/2006 | Bishop | |
| 2006/0219299 A1 | 10/2006 | Snowbarger | |
| 2006/0220844 A1 * | 10/2006 | Flanders | 340/540 |

OTHER PUBLICATIONS

International Search Report for PCT/US07/24924, mailed May 29, 2008.
IPRP for PCT/US07/24924, mailed Aug. 4, 2009.

* cited by examiner

*Primary Examiner* — John Breene
*Assistant Examiner* — Stephanie Bloss
(74) *Attorney, Agent, or Firm* — Abelman, Frayne & Schwab

(57) ABSTRACT

A method for diagnostics of a high integrity protection system (HIPS) for protection of a pipeline downstream of a wellhead includes: monitoring for initiation of an automatic trip or manual safety shutdown or full shut-off test; determining the process safety time (PST) that elapses between the time at which the upstream pressure reached the trip setpoint and the time at which the upstream pressure reaches the maximum allowable piping pressure (MAPP) of the downstream pipeline; and verifying that the safety critical isolation valves stroked to the fully closed position within ½ PST and that the downstream pressure did not exceed the MAPP. If the verification shows that either of those parameters are not met, then the HIPS signals an alarm to operators, and in the case of a manual safety shutdown or full shut-off test, resets the pressure trip setpoint to a lower level.

8 Claims, 7 Drawing Sheets

WELLHEAD HIPS WITH AUTOMATIC TESTING AND SELF-DIAGNOSTICS

RELATED APPLICATION

This application is a Continuation-in-Part of U.S. patent application Ser. No. 11/648,312 filed on Dec. 29, 2006 now U.S. Pat. No. 7,905,251, which is incorporated herein by reference.

FIELD OF THE INVENTION

The present invention relates to a method and an apparatus for the operation and testing of a high integrity protection system (HIPS) connected to a wellhead pipeline system.

BACKGROUND OF THE INVENTION

In the oil and gas industry, wellhead topside pressure may exceed a maximum allowed pressure within production fluid pipelines downstream of the wellhead due to degraded pipe wall thickness or cost limitations that prevent the installation of full-rated piping. It is therefore necessary that such pipelines be protected against excessive pressure that might rupture the pipe, which would cause environmental pollution and be very expensive to replace. A conventional system used to protect pipelines from over-pressure is the high integrity protection system (HIPS). This is typically an electro-hydraulic system employing pressure sensors to measure the pressure in the pipes which are used through the electronics of a control module to control the closure of a production pipe HIPS valve. This arrangement retains the high pressure within a short section of pipeline between the production tree and the HIPS valve which is capable of withstanding the pressure. This prevents the main, thinner-walled section of the pipeline from being exposed to pressure levels which may exceed the pipeline's pressure rating.

It is a necessary requirement that the safety of the HIPS be tested regularly since a malfunction in operation of the HIPS presents the risk of significant damage to the pipeline. The conventional system cannot be tested during its operation. Thus, the production system has to cease operations and be isolated for the test. The interruption of operations has serious financial implications. In addition, at least one operator has to be close to the HIPS during the test, since operations of valves and other components are performed by people manually.

Various approaches have been proposed for testing and protecting valves and pipeline systems from overpressure. For example, published application US2005/0199286 discloses a high integrity pressure protection system in which two modules connected to two downstream pipelines and two upstream pipelines have inlet and outlet ports. A conduit circuit connects the two ports and a docking manifold is installed in the pipeline between upstream and downstream portions. The docking manifold selectively routes flows in each of the first and second pipelines through the first or second module. The system permits routing of flows from upstream regions of both of the pipelines through one of the modules and then to a downstream region of one of the pipelines to permit the other module to be removed for maintenance, repair and/or replacement. There is no disclosure or suggestion of an apparatus or method for testing the operation of the system while it is in operation.

For example, U.S. Pat. No. 6,591,201 to Hyde discloses a fluid energy pulse test system in which energy pulses are utilized to test dynamic performance characteristics of fluid control devices and systems, like gas-lift valves. This test system is useful for testing surface safety valves in hydraulic circuits, but does not provide safety information of the overall system's ability to perform safety function.

U.S. Pat. No. 6,880,567 to Klayer, et al. discloses a system that includes sensors, a safety control system and shut off valves used for protecting downstream process equipment from overpressure. This system utilizes a partial-stroke testing method in which block valves are closed until a predetermined point and then reopened. This system, however, has to interrupt production for the diagnostic testing.

U.S. Pat. No. 7,044,156 to Webster discloses a pipeline protection system in which pressure of fluid in a section of pipeline that exceeds a reference pressure of the hydraulic fluid supplied to a differential pressure valve, the differential pressure valve is opened, and thereby causes the hydraulic pressure in the hydraulically actuated valve to be released via a vent. The protection system, however, does not provide any valve diagnostic means and is forced to interrupt the production for shut off valves to be fully closed.

U.S. Pat. No. 5,524,484 to Sullivan discloses a solenoid-operated valve diagnostic system which permits the valve user with the ability to monitor the condition of the valve in service over time to detect any degradation or problems in the valve and its components and correct them before a failure of the valve occurs. This system does not permit a testing of shut off valves without an interruption of production.

U.S. Pat. No. 4,903,529 to Hodge discloses a method for testing a hydraulic fluid system in which a portable analyzing apparatus has a supply of hydraulic fluid, an outlet conduit, a unit for supplying hydraulic fluid under pressure from the supply to the outlet conduit, a return conduit communicating with the supply, a fluid pressure monitor connected to the outlet conduit, and a fluid flow monitor in the return conduit. The analyzing apparatus disconnects the fluid inlet of the device from the source and connects the fluid inlet to the outlet conduit, and disconnects the fluid outlet of the device from the reservoir and connects that fluid outlet to the return conduit. Fluid pressure is monitored in the outlet conduit and the flow of fluid through the return conduit with the unit in place in the system. This method, however, requires that the production be interrupted for the testing of the hydraulic system.

U.S. Pat. No. 4,174,829 to Roark, et al. discloses a pressure sensing safety device in which a transducer produces an electrical signal in proportion to a sensed pressure and a pilot device indicates a sensing out-of-range pressure when the sensed pressure exceeds a predetermined range, which permits an appropriate remedial action to be taken if necessary. The device requires operators intervention.

U.S. Pat. No. 4,215,746 to Hallden, et al. discloses a pressure responsive safety system for fluid lines which shuts in a well in the event of unusual pressure conditions in the production line of the well. Once the safety valve has closed, a controller for detecting when the pressure is within a predetermined range is latched out of service and must be manually reset before the safety valve can be opened. The system results in an interruption of production and operators intervention.

An additional limitation of existing testing and protection systems relates to diagnostic procedures. Existing technology relies on process simulations and system performance verification procedures conducted once during system design and commissioning to set the trip point for the protection system. However, this procedure does not take into account the fact that process dynamics and valve stroke time can change with the passage of time.

It is therefore an object of the present invention to provide an apparatus and a method for testing the HIPS while it is in operation while the HIPS operates as a flowline to a piping system and without shutting down the production line to which it is connected.

Another object is to provide an apparatus and a method for automatically testing the safety of a HIPS without the intervention of an operator.

It is an additional object of the present invention to perform measurements at each system demand and verify that the HIPS response time remains within an appropriate range based upon those measurements, rather than based upon historic start-up data.

SUMMARY OF THE INVENTION

The above objects, as well as other advantages described below, are achieved by the method and apparatus of the invention which provides a high integrity protection system (HIPS) which protects and tests the control of a piping system connected to a wellhead. The HIPS of the present invention has an inlet for connection to the wellhead and an outlet for connection to the downstream piping system and, in a preferred embodiment, is constructed as a skid-mounted integral system for transportation to the site where it is to be installed.

The HIPS comprises two sets of surface safety valves (SSVs), two vent control valves (VCVS) and a safety logic solver. The two sets of SSVs are in fluid communication with the inlet, and the two sets are in parallel with each other. Each set of SSVs has two SSVs in series, and either one or both of the two sets of SSVs is operable as a flowline for fluids entering the inlet and passing through the HIPS outlet for the piping system. Each of the VCVs is connected to piping intermediate the two sets of SSVs, and each of the VCVs is in fluid communication with a vent line, which upon opening of a VCV vents process pressure between the two SSVs. The safety logic solver is in communication with the SSVs and the VCVs and produces signals to control the operation of the SSVs and VCVs. The VCVs are preferably electrically operated.

The pressure sensing transmitters monitor the flowline pressure on a section of piping upstream of the HIPS outlet. In a preferred embodiment, three pressure transmitters are provided on the outlet. The logic solver is programmed to transmit a signal to close the SSVs upon an increase in pressure above a threshold value transmitted by at least two of the three pressure sensors. As will be apparent to one of ordinary skill in the art, more or less than three pressure sensors can be employed in this part of the system.

Each of the two VCVs is connected to a flowline that is in fluid communication with a common vent line. The vent line can be connected to a reservoir tank or other storage or recirculating means. Each set of SSVs is operable independently of the operation of the parallel set of SSVs. Pressure sensing transmitters are positioned for monitoring the pressure between the SSVs in each of the two sets of SSVs.

In a preferred embodiment, the safety logic solver is programmed to maintain one set of the SSVs in an open position when the parallel set of SSVs is moved to a closed position from an open position during a tight shut-off test. In addition, the safety logic solver is programmed to measure and record the pressure between a pair of the closed SSVs during the tight shut-off test, and to open the VCV between the closed SSVs for a short period of time during the test to relieve or reduce the line pressure.

In another preferred embodiment, the safety logic solver is programmed to generate a failure signal during the tight shut-off test period if the pressure between the closed and vented SSVs rises above a predetermined threshold value following closing of the VCV. In still another preferred embodiment, the safety logic solver is programmed to designate the closed SSVs for use as an operating set of SSVs if, during the test period, the pressure between the closed SSVs does not rise above a predetermined threshold value.

The VCVs are closed during normal operations and during a manual full shutdown (i.e., a manual safety shutdown or a full shut-off test).

The HIPS of the invention further comprises manual shut-off valves positioned upstream and downstream of each of the parallel sets of SSVs, which can be used to isolate each of the SSV sets from the piping system, e.g., for maintenance, repairs and/or replacement of system components.

In a preferred embodiment, the SSVs are provided with electric failsafe valve actuators, whereby all of the valves are moved to a closed position in the event of a power failure. This would result in a termination of all fluid flow in the pipeline downstream of the HIPS. As will be apparent to those of ordinary skill in the art, this type of failsafe shut down would be coordinated with similar shut down requirements at the wellhead or elsewhere upstream of the HIPS.

In another aspect of the invention, a method is provided to test the operational safety of a HIPS that is connected to a wellhead pipeline system. The HIPS has first and second sets of surface safety valves (SSVs) in fluid communication with the piping system, and the two sets are in parallel with each other. Each set of SSVs has two SSVs in series, and the SSVs are operable in response to signals from a safety logic solver as was described in detail above.

The first set of SSVs moves from an open position to a closed position for a tight shut-off safety test while the second set of SSVs is open as a flowline for the pipeline system.

A transmitter positioned between the closed SSVs transmits a signal to the safety logic solver that corresponds to the pressure of fluid in the piping between the two closed valves. The VCV located between the closed set of SSVs vents the pressurized fluid between the closed SSVs at the beginning of the safety test. The vented fluid is preferably passed to a reservoir. An alarm signal is actuated if the first set of SSVs do not maintain the pressure in the piping between the SSVs at or below a predetermined threshold level during a predetermined shut down time.

The pressure, e.g., in PSI, of the fluid in the section of piping between each set of SSVs is recorded before and during the safety shutoff testing of the valves. A graphic display of the recorded pressure is preferably provided to assist operating personnel in evaluating the performance of the system in real time during the test.

The second set of SSVs remains open while the first set of SSVs return to the fully open position. If the first set of SSVs do not open fully, an alarm signal is actuated. Each of the two sets of surface safety valves is provided with a vent control valve (VCV). The VCV connected to the first set of SSVs opens for a predetermined period of time to effect the pressure venting after the first set of SSVs are fully closed.

The first set of SSVs are moved to the open position and the second set of SSVs are moved to the closed position. The pressure between the SSVs of the second set of SSVs is measured and an alarm signal is actuated if the second set of SSVs do not maintain the pressure in the intermediate piping at or below a predetermined level.

In a further preferred embodiment, the HIPS pressure trip setpoint is initially set at installation, e.g., by installation personnel. In the event that the upstream pressure exceeds the pressure trip setpoint, the HIPS system trips, closing all SSVs and terminating all fluid flow in the pipeline downstream of the HIPS. The HIPS identifies the process safety time (PST), which is the time required for the upstream pressure to advance from the trip setpoint to the maximum allowable piping pressure (MAPP) established for the downstream piping under protection. The PST is divided in half to yield the allowable stroke time (AST) for the HIPS valves to safely isolate the well. Upstream pressure measurements define the operational constraints, while downstream pressure measurements define the operational performance. If the SSVs move to the fully closed position within the AST and if the measured downstream pressure does not exceed the allowable maximum pressure defined for the downstream piping, then the HIPS performance met the design requirement. If, however, the SSVs do not fully close within the AST, then the HIPS system signals an alarm to operators to check the valve stroke time. The HIPS system also monitors whether the downstream pressure exceeds the MAPP, and if so, the HIPS system signals an alarm to operators to lower the trip setpoint.

In a further preferred embodiment, the HIPS pressure trip setpoint is initially set at installation, e.g., by installation personnel. Operators in the field activate a local control for a manual full shutdown to close all SSVs. The manual full shutdown is conducted either for a manual safety shutdown in response to a perceived safety problem, or for a full shut-off test that is conducted as part of planned testing and inspection procedures on a prescribed interval. While the manual safety shutdown or full shut-off test are initiated for different purposes, the HIPS system response is the same. The system measures the upstream and downstream pressure on a continuous or intermittent basis and records the pressure against time, e.g., every 250 ms, until the downstream pressure reaches steady state. The HIPS system closes all SSVs and terminates all fluid flow in the pipeline downstream of the HIPS. The HIPS identifies the process safety time (PST), which is the time required for the upstream pressure to advance from the trip setpoint to the maximum allowable piping pressure (MAPP) established for the downstream piping under protection. The PST is divided in half to yield the allowable stroke time (AST) for the HIPS valves to safely isolate the well. Upstream pressure measurements define the operational constraints, while downstream pressure measurements define the operational performance. If the SSVs move to the fully closed position within the AST and if the measured downstream pressure does not exceed the allowable maximum pressure defined for the downstream piping, then the HIPS performance met the design requirement. If, however, the SSVs do not fully close within the AST, then the HIPS system signals an alarm to operators to check the valve stroke time. The HIPS system also monitors whether the downstream pressure exceeds the MAPP, and if so, the HIPS system automatically lowers the trip setpoint.

BRIEF DESCRIPTION OF THE DRAWINGS

The present invention will be further described below and in conjunction with the accompanying drawings in which.

Figure 1:
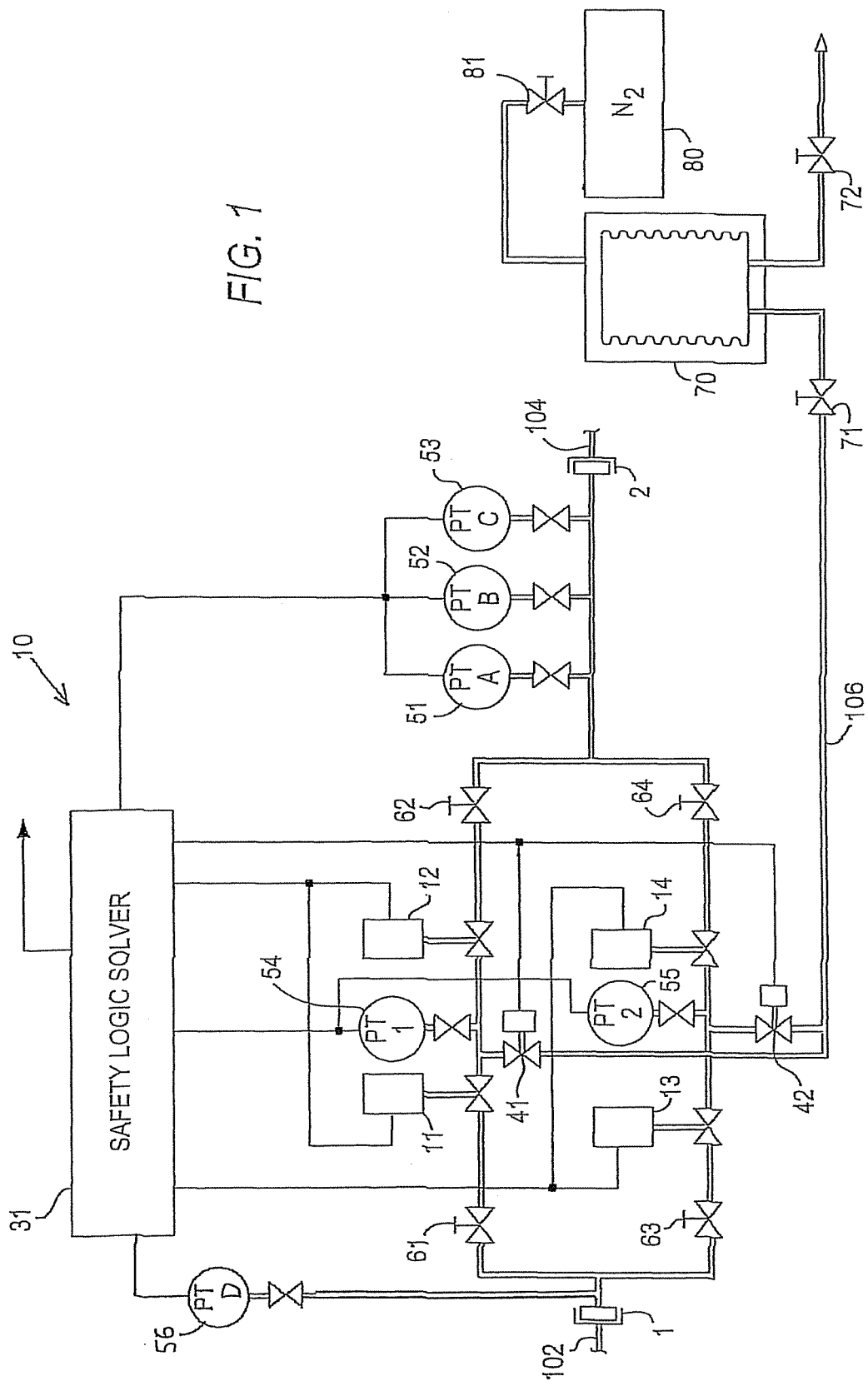
FIG. 1 is a schematic diagram of a high integrity protection system (HIPS) in accordance with the invention that is connected to a wellhead and a downstream pipeline.

To facilitate an understanding of the invention, the same reference numerals have been used, when appropriate, to designate the same or similar elements that are common to the figures. Unless stated otherwise, the features shown and described in the figures are not drawn to scale, but are shown for illustrative purposes only.

DETAILED DESCRIPTION OF THE INVENTION

Referring to FIG. 1, a high integrity protection system (HIPS) 10 is installed in proximity to a wellhead in a piping system to convey a pressurized fluid product, such as oil or gas, from the wellhead 102 to a remote host location via pipeline 104. The HIPS has an inlet 1 connected to the wellhead piping 102 and an outlet 2 connected to piping system 104 through which the liquid product enters and exits the HIPS 10. The HIPS is preferably skid-mounted for delivery to the site of the wellhead and is provided with appropriate flanges and adapters, if necessary, for attachment to the inlet and outlet to the oil field piping.

Two sets of surface safety valves (SSVs) 11, 12 and 13, 14 are in fluid communication with the inlet 1 and the outlet 2 are thereby operable as a flowline for the fluid product. Each set of SSVs, identified and referred to as SSV-1 and SSV-2, has two SSVs 11-12 and 13-14, respectively, which are connected in series. The SSVs close automatically in the absence of power being supplied to them and are maintained in an open position by conventional hydraulically or electrically powered actuators to protect the downstream piping system 104 from abnormal operational conditions.

Two vent control valves (VCVs) 41, 42 are connected to the piping intermediate the two set of SSVs 11, 12 and 13, 14, respectively, and are in fluid communication with a vent line 106. The vent line 106 is in fluid communication with a fluid reservoir 70 that serves as a closed collection system tank. Alternatively, the vent line can be routed to a burn pit (not shown) near the well site. The VCVs 41, 42 upon their opening can vent pressurized fluid between the two SSVs into the vent line 106. Valves 71,72 and 81 control supply of hydraulic pressure by the pressure reservoir via their opening and closing. When the valve 81 is opened, pressurized nitrogen from the tank 80 forces fluid out of the reservoir 70, either into the HIPS pipeline or via valve 72 for alternate use or disposal. The VCVs 41, 42 vent pressurized fluid from between the two SSVs into the vent line upon their opening. Pressure sensing transmitters 54, 55 are located between the respective SSVs to determine the flowline pressure between the two SSVs. Multiple pressure sensing transmitters can optionally be installed at locations 54 and 55 to assure reliability and as back-ups to the test system.

Pressure sensing transmitters 51, 52, 53 are installed upstream of the outlet 2 to monitor the flowline pressure exiting the HIPS from outlet 2. The three transmitters are monitored by the safety logic solver 31. If any two of three transmitters 51-53 sense a pressure rise above a predetermined threshold value, the safety logic solver 31 automatically shuts in the well via the SSVs 11-14, thereby protecting the downstream pipeline from excessive pressure.

Pressure sensing transmitter 56 is installed downstream of the inlet 1 and upstream of the HIPS 10 to monitor the flowline pressure entering the HIPS. The transmitter 56 is monitored by the safety logic solver 31.

A safety logic solver 31, which is preferably a software module preprogrammed in a computer or the like, is in communication with the SSVs 11-14, VCVs 41, 42, and pressure sensing transmitters 51-56 via a hard-wired connection or by wireless transmitters. The safety logic solver 31 produces and transmits signals to control the operation of the SSVs 11-14 and VCVs 41, 42. The control is performed based on pressure data from the pressure sensing transmitters 51-56.

Manual valves 61-64 are installed between inlet 1 and outlet 2 and SSVs 11-14 to isolate the two sets of SSVs 11-14 from the piping system in case of an emergency and also so that the system can be shut down manually for repair and/or replacement of any of its components.

All valves are operated by conventional valve actuators (not shown) such as those that are well known to art. The valve actuators and pressure transmitters 51-56 have self-diagnostic capabilities and communicate any faults to the safety logic solver 31 that are detected.

Figure 2:
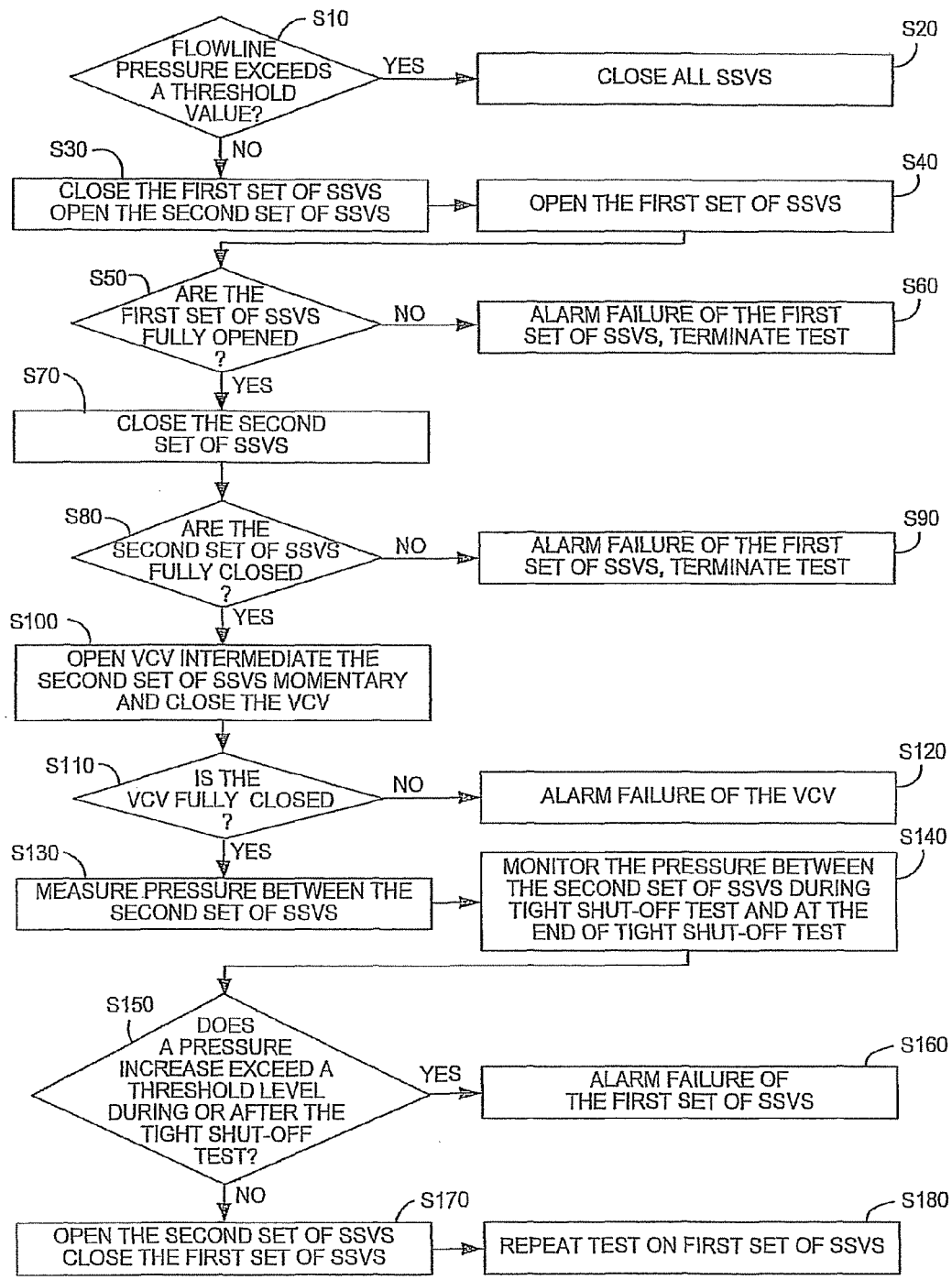
FIG. 2 is a flowchart of the process steps for a tight shut-off test on the HIPS of FIG. 1.

The method for conducting the tight shut-off test in accordance with the invention will be described with reference to FIG. 2. Before the commencement of the test, a safety check of the HIPS flowline is made (S10). If the flowline pressure exceeds a predetermined threshold level, all SSVs are closed (S20). Otherwise, the first set of SSVs 11, 12 are closed and the second set of SSVs 13, 14 remain opened (S30).

The first set of SSVs 11, 12 are then opened to prepare for a test of the second set of SSVs 13, 14 (S40). It is determined whether the first set of SSVs 11, 12 which are used as a flowline during the tight shut-off test of the second set of SSVs 13, 14 are fully opened (S50). If the first set of SSVs 11, 12 are not fully opened, an alarm signal is actuated and the test is terminated (S60). If the first set of SSVs 11, 12 are fully opened, the second set of SSVs 13, 14 are closed (S70). The full closing of the SSVs 13, 14 to be tested are checked for the preparation of the tight shut-off test (S80). If the SSVs 13, 14 are not fully closed, an alarm signal is actuated (S90) and the test is terminated.

If the SSVs 13, 14 are fully closed, the tight shut-off test of the SSVs 13, 14 is initiated. The VCV 42 located intermediate the second set of SSVs 13, 14 is opened to reduce the pressure between the SSVs 13, 14 to a stable value (S100).

The VCV 42 is then closed and the pressure sealing of VCV 42 is checked (S110). If the VCV 42 is not fully closed, or the valve is leaking so that pressure continues to drop in the vented section of pipe between the valves, an alarm signal is actuated (S120) and appropriate remedial action is taken. If the VCV 42 is fully closed, the pressure between the SSVs 13, 14 is measured (S130). The pressure between the SSVs 13, 14 continues to be monitored by the pressure transmitter 55 and the result is sent to the safety logic solver 31 during the tight shut-off test up to the end of the tight shut-off test period (S140).

Figure 3:
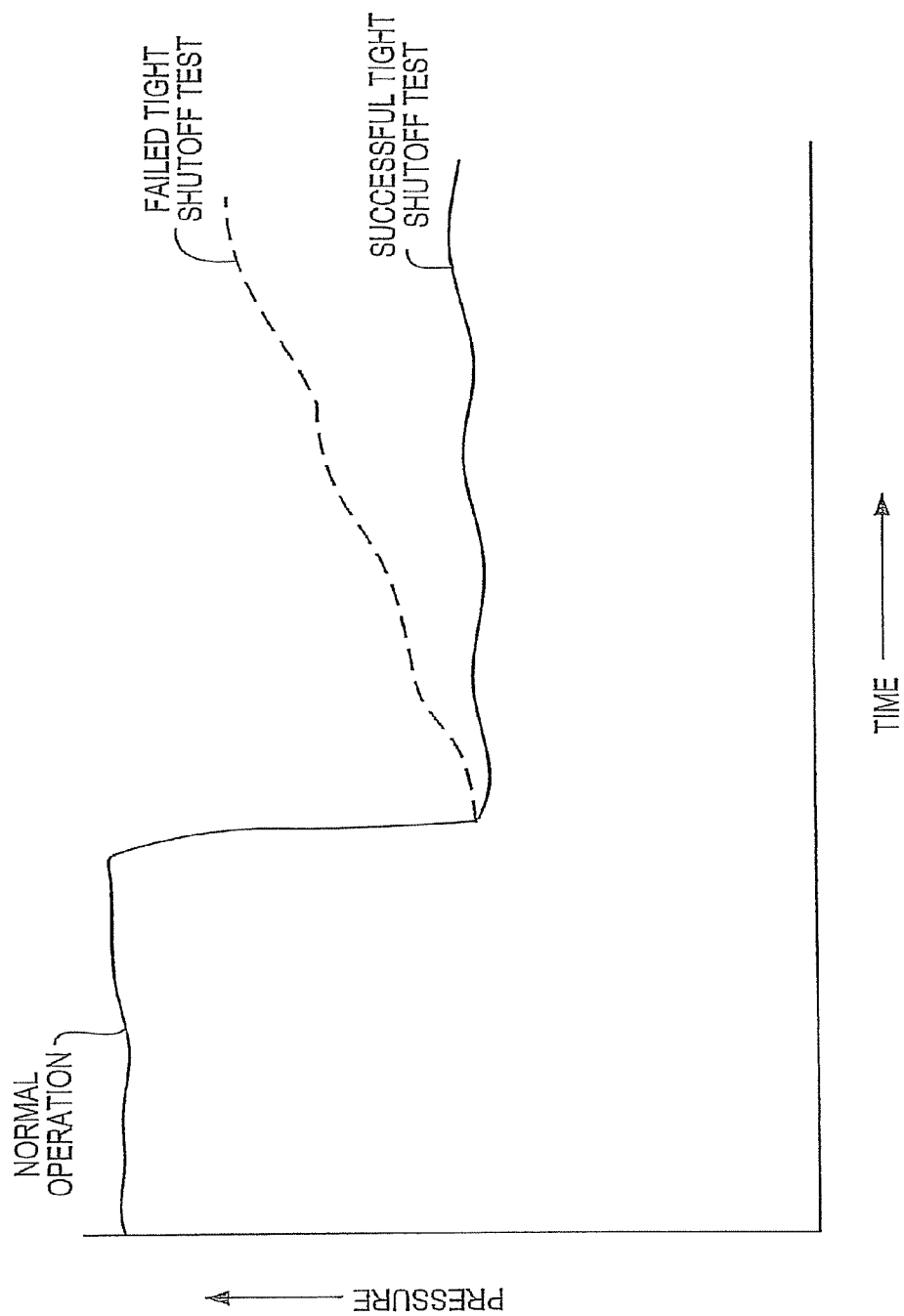
FIG. 3 is a comparative illustrative graphic display illustrating both a satisfactory and a failed pressure test of a pair of surface safety valves (SSVs) during the tight shut-off test.

The data obtained during the tight shut-off test is graphically represented for two different scenarios in FIG. 3. When the VCV 42 is opened, the pressure between the SSVs 13, 14 drops from a normal operating pressure to a lower pressure and the VCV 42 is fully closed. If the pressure between SSVs 13, 14 rises, that is deemed to be evidence that there is leakage in one or both of SSVs 13, 14. Since some minimal amount of leakage may be acceptable, it must be determined whether a pressure increase, or the rate of pressure increase, exceeds a predetermined threshold level during or after the period of the tight shut-off test (S150). If during the test period, the pressure rises above the threshold level, it indicates a failure in the ability of the SSVs 13, 14 to seat completely and an alarm signal is actuated by the safety logic solver 31 which notifies of the failure of the tight shut-off test of the SSVs 13, 14 (S160). If during the test period, the pressure increase does not exceed the threshold level, the second set of SSVs 13, 14 pass the tight shut-off test. The first set of SSVs 11, 12, were in an open position providing a flowpath for production during the tight shut-off testing of SSVs 13, 14 (S170). To complete the system functional testing, the second set of SSVs 13, 14, which passed the tight shut-off test, are opened again and used as a flowline (S180).

As will be apparent from the above description, the first set of SSVs 11, 12 is tested using substantially the same methodology.

The present invention enables the HIPS to operate continuously as a flowline while a tight shut-off test is performed, and while any necessary protective action can be taken. The automatic operation by the safety logic solver assures that emergency shut-off conditions will be carried out, even during a test. A record of the test is stored and can be recovered later or displayed electronically and/or in printed graphic form or as tabulated data.

Figure 4:
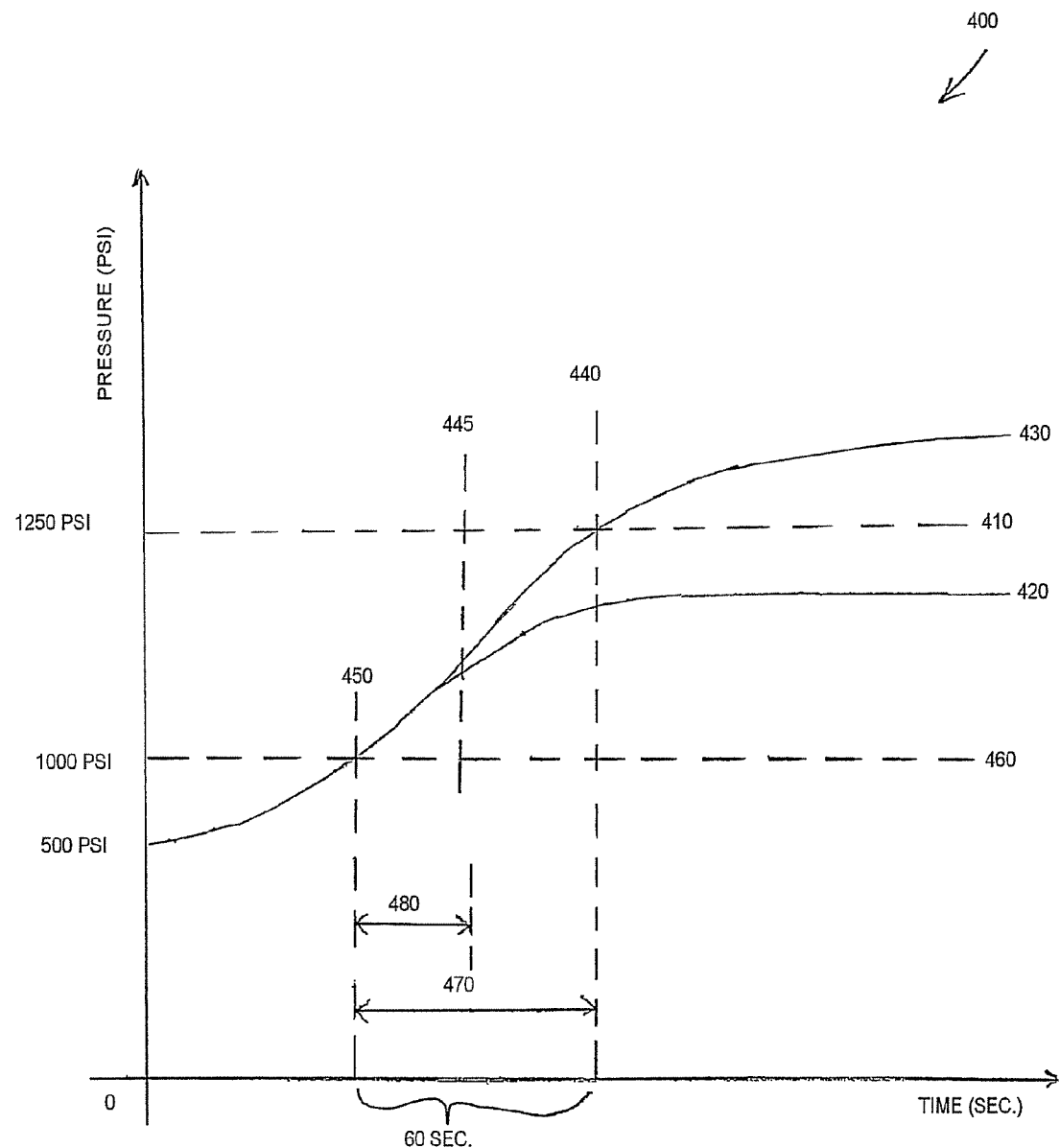
FIG. 4 is a graph showing the relationship between measured upstream and downstream pressure, the trip setpoint, the maximum allowable piping pressure, and the elapsed times PST and AST.

FIG. 4 is a pressure vs. time chart 400 (not drawn to scale) demonstrating an automatic trip of the HIPS system. The measured downstream pressure 420 and measured upstream pressure 430 are in a normal range (for example, 500 psi), when at time t=0 seconds the well pressure begins increasing. The downstream pressure 420 and upstream pressure 430 therefore begin rising. At first the downstream pressure 420 and upstream pressure 430 rise in unison, as the HIPS SVs are open and present no pressure differential. At time 450, the upstream pressure 430 has reached the pressure trip setpoint 460 (set, for example, at 1000 psi). Upon reaching trip setpoint 460, the HIPS valves begin closing at time 450, and the resulting pressure differential results in a divergence between the curves of downstream pressure 420 and upstream pressure 430.

The system records the time 450, the time 445 at which the SVs fully close, and the time 440 at which the upstream pressure 430 reaches a maximum allowable piping pressure (MAPP) 410 (for example, 1250 psi). The process safety time (PST) 470 represents the elapsed time between times 440 and 450 (for example, 60 seconds), while an allowable stroke time (AST) 480 represents ½ PST (for example, 30 seconds). As long as the SSVs move to the fully closed position (at time 445) before AST 480 has elapsed, and as long as the downstream pressure 420 reaches steady state at a pressure below MAPP 410, the HIPS is performing within design parameters. Otherwise, the system will activate an alarm.

Figure 5:
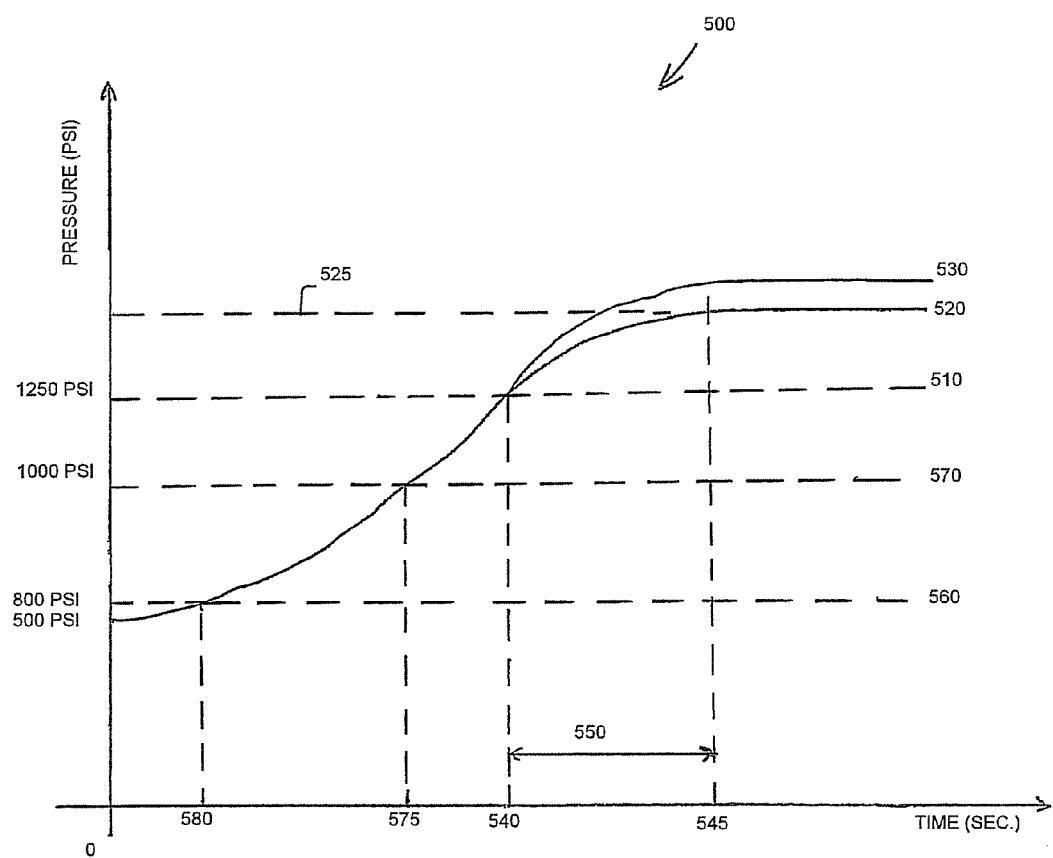
FIG. 5 is a graph showing that if the pressure trip setpoint is too high, the setpoint is lowered to an appropriate level.

FIG. 5 is a pressure vs. time chart 500 demonstrating a manual full shutdown (i.e., a manual safety shutdown or a full shut-off test) of the HIPS in which the HIPS is not performing within design parameters, as the downstream pressure 520 exceeds a MAPP 510. This necessitates a lowering of the HIPS pressure trip setpoint, which the system does automatically. The manual full shutdown can be conducted as part of a scheduled maintenance program, or alternatively can be performed after an automatic trip (as described above with reference to FIG. 4) has resulted in an alarm indicating performance outside design parameters. At time t=0 seconds, with the downstream pressure 520 and upstream pressure 530 at a normal pressure (for example, 500 psi), the operator manually initiates a manual full shutdown. The system begins recording the downstream pressure 520 and upstream pressure 530 against time. A trip set time differential (TSTD) 550 is calculated as the time that elapses between the time 540 at which the downstream pressure 520 exceeds MAPP 510 (for example 1250 psi) and the time 545 at which the downstream pressure 520 achieves a steady state 525. The TSTD 550 (for example 60 seconds) is then subtracted from the time 575 at which the upstream pressure 530 had reached the trip setpoint 570 (for example, 1000 psi). This yields resulting time 580, and the corresponding upstream pressure 560 (for example, 800 psi) at time 580 is selected as the new HIPS pressure trip setpoint.

With this system, the new HIPS pressure trip setpoint will never be set lower than the normal operating pressure. In another embodiment, a predetermined minimum pressure may be established, either as an absolute pressure (e.g., 600 psi) or as a percentage of the normal operating pressure (e.g., 120% of normal), below which the trip setpoint can not be set.

In another embodiment, when a manual full shutdown is performed as described above with reference to FIG. 5, the system can also determine the PST 470 and AST 480 as described with reference to FIG. 4, and a determination can be made whether the valve stroke time was within AST 480.

Figure 6:
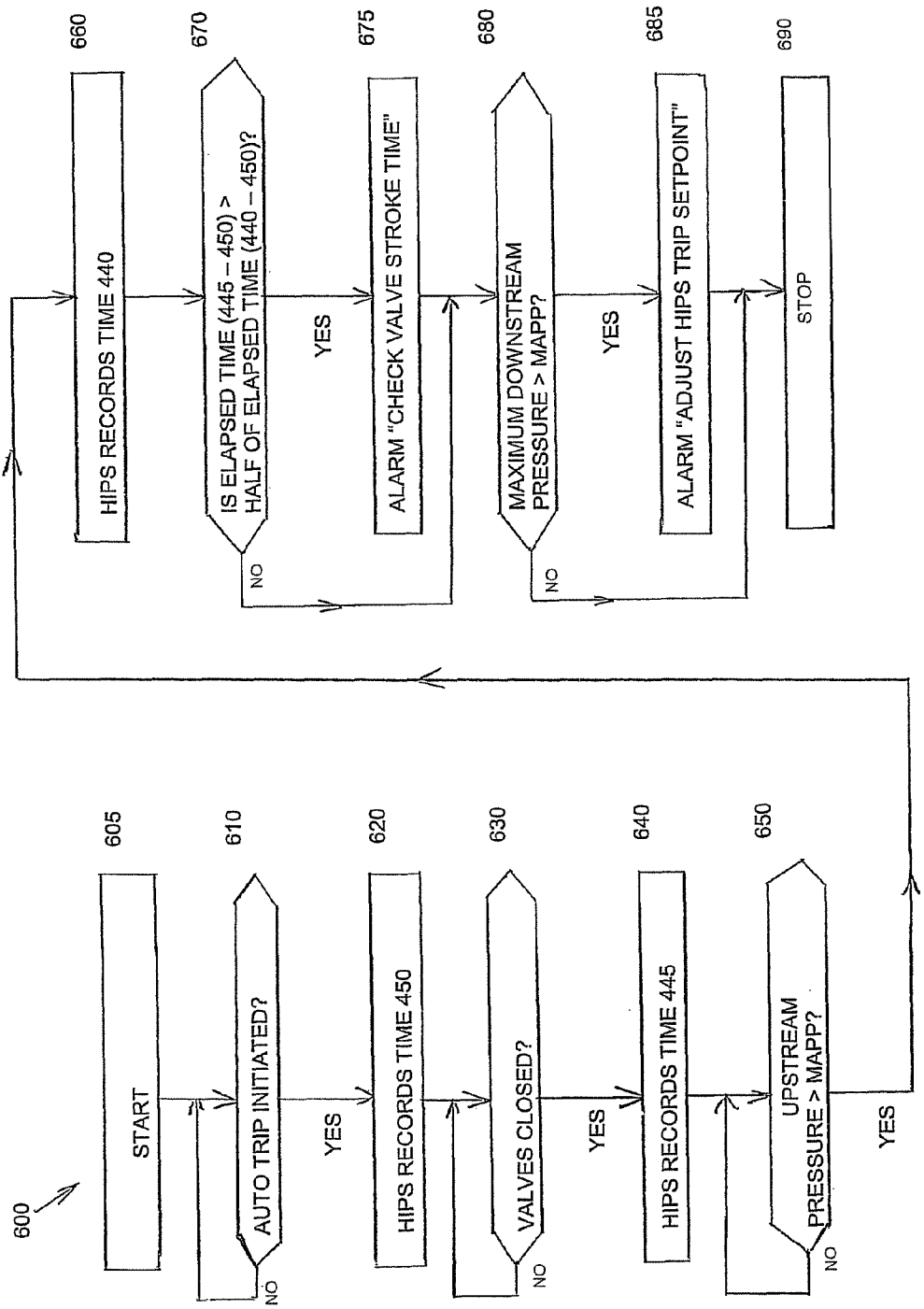
FIG. 6 is a flowchart of the process steps for self-diagnostics of the HIPS upon an automatic trip.

FIG. 6 presents a method 600 used during an automatic trip of the HIPS to verify that it is operating within design parameters. Method 600 can be programmed in SLS 31 to carry out this operation based upon data collected from pressure transmitters 51-56 and SSVs 11-14. The method begins with step 605.

Step 610 monitors for an automated trip based upon the upstream pressure 430 exceeding the pressure trip setpoint 460. Upon recognizing such a trip, step 620 stores the trip time 450 into the memory of the SLS 31.

Step 630 monitors for the closing of the surface safety valves. Upon recognizing that the SSVs have fully closed, step 640 stores the closing time 445 into the memory of the SLS 31.

Step 650 monitors the upstream pressure. Upon the upstream pressure reaching MAPP, step 660 stores the time 440. Step 670 determines whether the elapsed time required for the SSVs to fully closed (i.e., the difference between closing time 445 and trip time 450) is greater than half of the time required for the upstream pressure to reach MAPP (i.e., half of the difference between time 440 and trip time 450). If so, then the method advances to step 675 and issues an alarm signaling operators to check the valve stroke time. If not, then the SSVs closed in a timely fashion and the method skips step 675.

Step 680 determines whether the maximum downstream pressure exceeded MAPP. If so, then the method advances to step 685 and issues an alarm signaling operators to adjust the HIPS trip setpoint. If not, then the HIPS is operating within parameters and the method skips step 685. The method ends with step 690.

Figure 7:
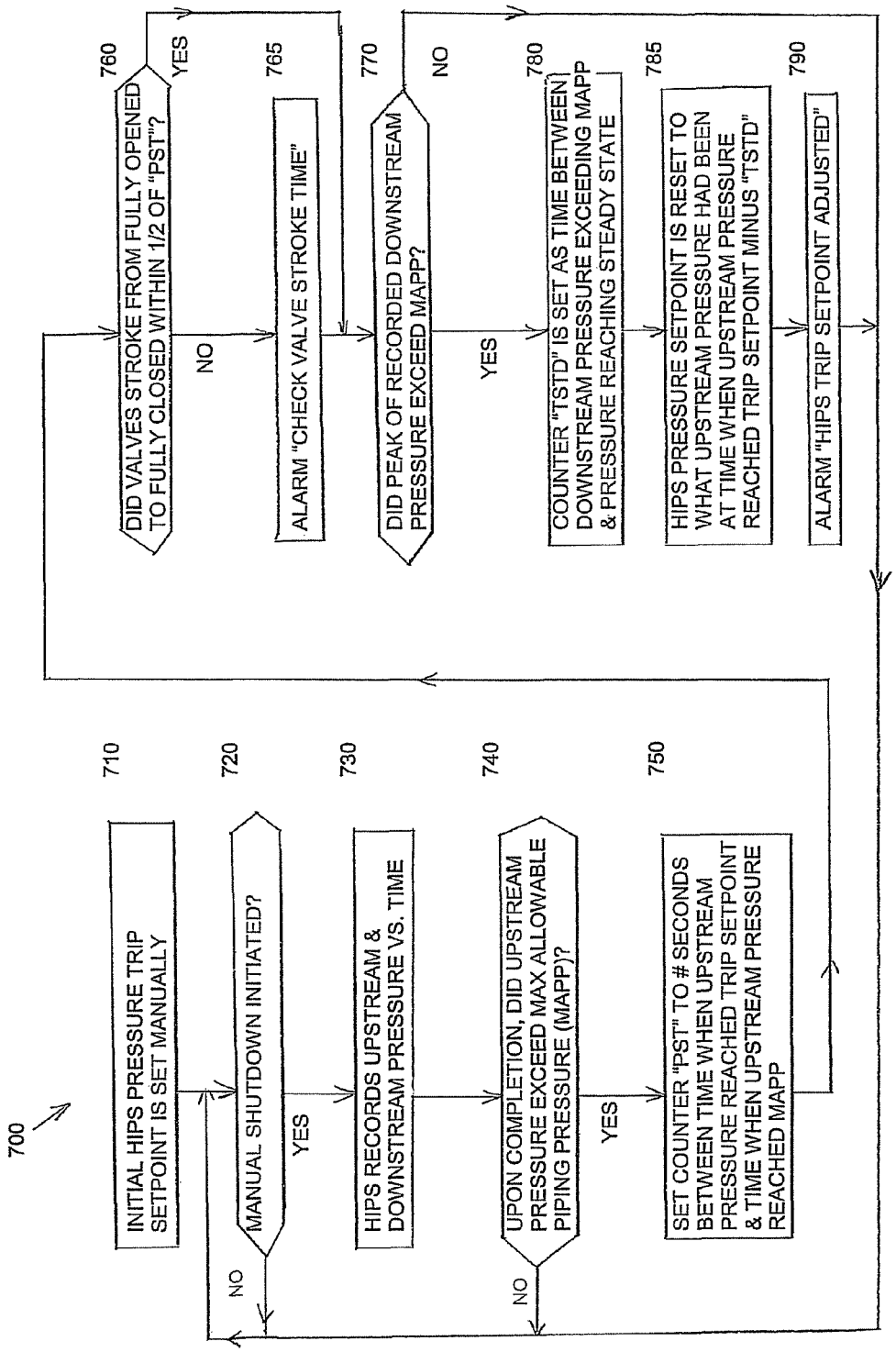
FIG. 7 is a flowchart of the process steps for self-diagnostics of the HIPS upon an operator-initiated manual safety shutdown or full shut-off test.

FIG. 7 presents a method 700 used during an operator-initiated manual full shutdown to determine a revised HIPS trip setpoint 560. Method 700 can be programmed in SLS 31 to carry out this operation based upon data collected from pressure transmitters 51-56 and SSVs 11-14.

In step 710, upon initial installation and commissioning of the HIPS, the initial trip setpoint 570 is set based upon stroke times and system conditions that exist at the time of installation or commissioning. Trip setpoint 570 and maximum allowable piping pressure (MAPP) 510 are stored in memory of the SLS 31.

After commissioning, step 720 monitors for initiation of an operator command to fully shut down the HIPS system while it is in normal operation. This manual full shutdown can be a manual safety shutdown in response to a perceived safety problem or can be a full shut-off test to verify process safety time requirements and verify the system response time.

Following the initiation of a manual full shutdown, step 730 begins recording upstream and downstream pressures against time (e.g., 4 times per second) in the safety logic solver, and continues to record the data either until a predetermined amount of time has passed (e.g. 10 minutes) or until the downstream pressure reaches steady state. For example, the upstream and downstream pressure will be measured from the time a shutdown is initiated until the downstream pressure reaches steady state.

In step 740, upon completion of the manual full shutdown, a determination is made whether the peak upstream pressure recorded reached the MAPP. If not, no action is required and the method loops back to the beginning of step 720. If so, the method continues with step 750, in which counter "PST" is set as the number of seconds that elapsed between the time when the upstream pressure reached the trip setpoint and the time when the upstream pressure reached the MAPP.

In step 760, a determination is made whether the isolation valves stroked from fully opened to fully closed within half of time PST, i.e., within the allowable stroke time (AST). If yes, the method advances to step 770; if not, in step 765 the HIPS issues an alarm signaling operators to check the valve stroke time, and then advances to step 770.

In step 770, a determination is made if the maximum downstream pressure had exceeded the MAPP. If not, then the HIPS pressure setpoint is satisfactory and the method loops back to step 720 to await the next manual safety shutdown or full shut-off test. If the MAPP was exceeded, then step 780 sets counter "TSTD" (representing the trip set time differential) as the number of seconds between the downstream pressure exceeding MAPP and the time at which the downstream pressure reached steady state.

In step 785, the HIPS pressure setpoint is reset from the initial trip setpoint 570 to revised trip setpoint 560, representing the value that the upstream pressure had been at TSTD seconds before it reached the previous trip setpoint. Step 790 signals an alarm to operators that the trip setpoint has been adjusted.

In another embodiment, not shown, the adjustment of the trip setpoint lower may be limited to a predetermined pressure (e.g., 600 psi) or to a predetermined percentage of the normal operating pressure (e.g., 120% of normal).

Although various embodiments that incorporate the teachings of the present invention have been shown and described in detail, other and varied embodiments will be apparent to those of ordinary skill in the art and the scope of the invention is to be determined by the claims that follow.

I claim:

1. A method of testing a high integrity protection system (HIPS) with a predetermined pressure trip setpoint, the method comprising:

providing a high integrity protection system (HIPS) that has first and second sets of surface safety valves (SSVs) in fluid communication with an inlet from an upstream pipeline, the two sets being in parallel with each other, each set of SSVs having two SSVs in series, the outlet of the second set of SSVs being connected to the outlet of the first set of SSVs such that the outputs of both sets of SSVs proceed through a common outlet pipe to a downstream piping system, the SSVs being operable in response to signals from a safety logic solver;

and providing a safety logic solver to:

initiate a manual full shutdown of the HIPS during normal operations;

record pressure versus time data of fluid flow from the upstream pipeline upstream of the HIPS inlet and from the downstream piping system downstream of the HIPS outlet; and upon the closing of the SSVs, determine whether the recorded upstream pressure reached a predetermined maximum allowable piping pressure (MAPP) of the downstream piping system, in which case;

determine an elapsed process safety time (PST) between the initiation of the manual full shutdown and the time at which the upstream pressure reached the MAPP;

determine if the SSVs required more than half of the PST to stroke from fully opened to fully closed, in which case signaling an alarm to operators; and determine if the recorded downstream pressure reached the MAPP, in which case lowering the HIPS pressure trip setpoint.

2. The method of claim 1, in which the safety logic solver, upon determining that the downstream pressure reached the MAPP:

determines a trip set time differential (TSTD) as the elapsed time between downstream pressure exceeding MAPP and the downstream pressure reaching steady state; and in which upon lowering the HIPS pressure trip setpoint, lowers it to what the upstream pressure had been at a time TSTD less than the previous system trip setting.

3. The method of claim 1, in which the safety logic solver, upon determining that the downstream pressure reached the MAPP;

determines a trip set time differential (TSTD) as the elapsed time between downstream pressure exceeding MAPP and the downstream pressure reaching steady state;

and in which upon lowering the HIPS pressure trip setpoint, lowering lowers it to what the upstream pressure had been at a time TSTD less than the previous system trip setting.

4. A high integrity protection system (HIPS) with self-diagnostics for testing the protection and pressure control of a piping system connected to a wellhead, the HIPS having an inlet connected to the wellhead and an outlet connected to the piping system, the protection system comprising:

two sets of surface safety valves (SSVs) in fluid communication with the inlet, the two sets being in parallel fluid flow relation to each other, each set of SSVs consisting of two SSVs in series, the outlet of the second set of SSVs being connected to the outlet of the first set of SSVs such that the outputs of both sets of SSVs proceed through a common outlet pipe, either one or both of the two sets of SSVs operable as a flowpath for fluids entering the inlet and passing through the HIPS outlet to the common outlet pipe;

two vent control valves (VCVs), each of which is connected to piping intermediate each of the two sets of SSVs, each of the VCVs being in fluid communication with a vent line, whereby, upon opening of a VCV, process pressure between the two SSVs is vented; and a safety logic solver in communication with the SSVs and the VCVs, the safety logic solver generating signals to control the operation of the SSVs and VCVs, the safety logic solver further comprising:

a processor coupled to a memory;
a clock; and
a memory that stores
a preliminary HIPS trip setpoint;
a maximum allowable piping pressure (MAPP);

a first module executable by the processor for monitoring for the initiation of a manual full shutdown, upon which recording pressure versus time data of fluid flow upstream of the HIPS inlet and downstream of the HIPS outlet, and upon recognizing that the SSVs have closed, determining if the upstream pressure exceeded MAPP, in which case setting a counter PST equal to the elapsed time in seconds between the time at which the upstream pressure reached the system trip setpoint and the time at which the upstream pressure reached the MAPP, and determining if the SSVs required more than half the PST to fully close, in which case signaling an alarm to operators to check the valve stroke time;

a second module executable by the processor if the first module determines that the upstream pressure exceeded MAPP, the second module determining whether the downstream pressure exceeded the MAPP, and if so, lowering the HIPS pressure trip setpoint.

5. The system of claim 4, in which the second module, upon determining that the downstream pressure reached the MAPP, determines a trip set time differential (TSTD) as the elapsed time in seconds between downstream pressure exceeding MAPP and the downstream pressure reaching steady state;

and in which the second module, upon lowering the HIPS pressure trip setpoint, lowers it to what the upstream pressure had been at a time TSTD seconds prior to the time when the upstream pressure reached the previous trip setpoint.

6. The system of claim 4, in which the second module, upon determining that the downstream pressure reached the MAPP, determines a trip set time differential (TSTD) as the elapsed time in seconds between downstream pressure exceeding MAPP and the downstream pressure reaching steady state; and in which the second module, upon lowering the HIPS pressure trip setpoint, lowers it to what the upstream pressure had been at a time TSTD seconds prior to the time when the upstream pressure reached the previous trip setpoint.

7. A method of operating a high integrity protection system (HIPS) with a predetermined pressure trip setpoint and a predetermined maximum allowable piping pressure (MAPP), the method comprising:

providing a high integrity protection system HIPS that has first and second sets of surface safety valves (SSVs) in fluid communication with an inlet from an upstream pipeline, the two sets being in parallel with each other, each set of SSVs having two SSVs in series, the outlet of the second set of SSVs being connected to the outlet of the first set of SSVs such that the outputs of both sets of SSVs proceed through a common outlet pipe to a downstream piping system, the SSVs being operable in response to signals from a safety logic solver;

and providing a safety logic solver to:

monitor for the pressure of fluid flow upstream of the HIPS inlet exceeding the predetermined pressure trip setpoint, upon which the safety logic solver commands the closure of the safety isolation valves and records the time of the trip;

monitor for the closing of the safety isolation valves, upon which the safety logic solver records the time of closure;

monitor for the pressure of fluid flow upstream of the HIPS inlet exceeding the MAPP, upon which the safety logic solver records the time;

determine whether the time that elapsed between the time of trip and time of closure is greater than half the time that elapsed between the time of trip and the time at which the upstream pressure exceeded MAPP, in which case the safety logic solver signals an alarm to operators; and monitor whether the pressure of fluid flow downstream of the HIPS outlet exceeds MAPP, in which case the safety signals an alarm to operators.

8. A high integrity protection system (HIPS) with self-diagnostics for testing the protection and pressure control of a piping system connected to a wellhead, the HIPS having an inlet connected to the wellhead and an outlet connected to the piping system, the protection system comprising:

two sets of surface safety valves (SSVs) in fluid communication with the inlet, the two sets being in parallel fluid flow relation to each other, each set of SSVs consisting of two SSVs in series, the outlet of the second set of SSVs being connected to the outlet of the first set of SSVs such that the outputs of both sets of SSVs proceed through a common outlet pipe, either one or both of the two sets of SSVs operable as a flowpath for fluids entering the inlet and passing through the HIPS outlet to the common outlet pipe;

two vent control valves (VCVs), each of which is connected to piping intermediate each of the two sets of SSVs, each of the VCVs being in fluid communication with a vent line, whereby, upon opening of a VCV, process pressure between the two SSVs is vented; and a safety logic solver in communication with the SSVs and the VCVs, the safety logic solver generating signals to control the operation of the SSVs and VCVs, the safety logic solver further comprising:

a processor coupled to a memory;
a clock; and
a memory that stores
a preliminary HIPS trip setpoint;
a maximum allowable piping pressure (MAPP);
a first module executable by the processor for monitoring for the initiation of an automatic trip based upon the upstream fluid flow pressure exceeding the preliminary HIPS trip setpoint, upon which recording the time of the trip;
a second module executable by the processor if the first module determines that an automatic trip was initiated, the second module determining whether the safety isolation valves fully closed, upon which recording the time of the closure;
a third module executable by the processor if the second module determines that the safety isolation valves fully closed, the third module monitoring whether the upstream pressure exceeds the MAPP, upon which recording the time; and
a fourth module executable by the processor if the third module determines that the upstream pressure exceeds the MAPP, the fourth module:
determining whether the elapsed time between the time of the trip and the time of closure is greater than half the time that elapsed between the time of trip and the time at which the upstream pressure exceeded MAPP, in which case signaling an alarm to operators; and
monitoring whether the pressure of fluid flow downstream of the HIPS outlet exceeds MAPP, in which case signaling an alarm to operators.

* * * * *

UNITED STATES PATENT AND TRADEMARK OFFICE
CERTIFICATE OF CORRECTION

Page 1 of 1

PATENT NO. : 8,725,434 B2
APPLICATION NO. : 13/008989
DATED : May 13, 2014
INVENTOR(S) : Patrick S. Flanders It is certified that error appears in the above-identified patent and that said Letters Patent is hereby corrected as shown below:

On the Title Page under the Abstract change 8 Claims to read 6 Claims.

In the Claims

Delete claim 3 (which is a duplicate of claim 2).

Delete claim 6 (which is a duplicate of claim 5).

Col. 11 Lines 39 thru Col. 12 Line 42----Renumber the remaining claims as listed.

Claim 4 should read claim 3, Claim 5 should read claim 4, Claim 7 should read claim 5 and Claim 8 should read claim 6.

Signed and Sealed this
Twenty-seventh Day of October, 2015

Michelle K. Lee
*Director of the United States Patent and Trademark Office*